US008751417B2

(12) United States Patent
Watanabe et al.

(10) Patent No.: US 8,751,417 B2
(45) Date of Patent: Jun. 10, 2014

(54) TROUBLE PATTERN CREATING PROGRAM AND TROUBLE PATTERN CREATING APPARATUS

(75) Inventors: Yukihiro Watanabe, Kawasaki (JP); Masazumi Matsubara, Kawasaki (JP); Atsuji Sekiguchi, Kawasaki (JP); Yuji Wada, Kawasaki (JP); Yasuhide Matsumoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 570 days.

(21) Appl. No.: 13/029,931

(22) Filed: Feb. 17, 2011

(65) Prior Publication Data

US 2011/0208679 A1    Aug. 25, 2011

(30) Foreign Application Priority Data

Feb. 22, 2010 (JP) ................. 2010-036512

(51) Int. Cl.
*G06F 15/18* (2006.01)
(52) U.S. Cl.
USPC ............. 706/12; 370/392; 370/311; 709/224; 706/62
(58) Field of Classification Search
None
See application file for complete search history.

(56) References Cited

U.S. PATENT DOCUMENTS

| | | | | |
|---|---|---|---|---|
| 5,321,795 | A * | 6/1994 | Alvarez de Toledo | 706/62 |
| 5,968,124 | A * | 10/1999 | Takahashi et al. | 709/224 |
| 2004/0199828 | A1 | 10/2004 | Cabezas et al. | |
| 2005/0015668 | A1 | 1/2005 | Doyle et al. | |
| 2006/0161903 | A1 | 7/2006 | Anand et al. | |
| 2006/0256714 | A1 | 11/2006 | Takagi | |
| 2008/0019367 | A1 * | 1/2008 | Ito et al. | 370/392 |
| 2008/0307269 | A1 | 12/2008 | Bennett et al. | |
| 2011/0119384 | A1 | 5/2011 | Morimoto et al. | |

FOREIGN PATENT DOCUMENTS

| | | |
|---|---|---|
| JP | 2000-010805 | 1/2000 |
| JP | 2004-363946 | 12/2004 |
| JP | 2006-318071 A | 11/2006 |
| WO | WO-2010-001482 | 1/2010 |

OTHER PUBLICATIONS

"Analysis of Non-Gaussian Nature of Network Traffic" Mori et al IEICE General Conference 2002, Tokyo, Japan.*
Great Britain Search Report mailed Jun. 9, 2011 for corresponding Great Britain Application No. 1103038.4.
"Japanese Office Action" mailed by JPO and corresponding to Japanese application No. 2010-036512 on Jul. 30, 2013, with English translation.

* cited by examiner

*Primary Examiner* — Kakali Chaki
*Assistant Examiner* — Luis Sitiriche
(74) *Attorney, Agent, or Firm* — Fujitsu Patent Center

(57) ABSTRACT

A computer readable, non-transitory medium has stored therein a trouble pattern creating program. The program causes a computer to execute: (a) extracting, from a plurality of log messages that are output from an information system having a plurality of configuration items and that are output in a predetermined period of time, configuration items that output the log messages; (b) calculating a degree of relationship between the configuration items extracted in the (a) extracting; (c) executing learning of the rate of the number of occurrences of troubles in the information system in the number of times the log messages are output, the learning is executed by a number of times corresponding to the degree of relationship calculated in the (b) calculating; and (d) creating, in accordance with a result of the learning in the (c) executing, a trouble pattern message that is output when a trouble occurs.

5 Claims, 14 Drawing Sheets

| TIME | MESSAGE TYPE ID | MESSAGE SENDING CI |
|---|---|---|
| 2009-06-08T10:20:00-09:00 | 0012 | web1 |
| 2009-06-08T10:18:52-09:00 | 0017 | ap1 |
| 2009-06-08T10:18:40-09:00 | 0017 | ap2 |
| 2009-06-08T10:16:33-09:00 | 0017 | ap1 |
| 2009-06-08T10:16:33-09:00 | 0005 | db1 |
| 2009-06-08T10:16:31-09:00 | 0005 | db1 |
| : | : | : |

FIG.5

```
<?xml version="1.0" encoding="UTF-8" standalone="no"?>
<Troubles>
    <Trouble id="5" startDate="2009/01/05-18:27:00" endDate="2009/01/05-19:05:00" title="Web Down" />
    <Trouble id="21" startDate="2009/01/07-18:22:00" endDate="2009/01/07-19:20:00" title="HDD Fault" />
    <Trouble id="39" startDate="2009/01/14-16:13:00" endDate="2009/01/14-16:14:00" title="DB Slow Down" />
    <Trouble id="49" startDate="2009/01/20-04:14:00" endDate="2009/01/20-19:05:00" title="Web Slow Down" />
</Troubles>
```

FIG.6

| HOP COUNT h | WEIGHTING FACTOR |
|---|---|
| h=1 | 1.0 |
| h=2 | 0.8 |
| h=3 | 0.6 |
| h=4 | 0.2 |
| h≥5 | 0.0 |

FIG.7

| WEIGHTING FACTOR w | NUMBER OF REPETITIONS |
|---|---|
| 1.0≤w | 5 |
| 0.8≤w<1.0 | 4 |
| 0.6≤w<0.8 | 3 |
| 0.4≤w<0.6 | 2 |
| 0.2≤w<0.4 | 1 |
| w<0.2 | 0 |

FIG.8

```
<?xml version="1.0" encoding="UTF-8" standalone="no"?>
<Patterns>
    <Trouble id="5">
    <Pattern events="[0005, 0148, 0150]" score="0.018"/>
    <Pattern events="[0002, 0095, 0098, 0110]" score="0.125"/>
    <Pattern events="[0006, 0095, 0110, 0148]" score="1.0"/>
</Patterns>
```

FIG.9

| META-INFORMATION | |  |
|---|---|---|
| WINDOW TIME | 2009-06-08T10:20:00-09:00 | |
| WINDOW WIDTH | 10 MINUTES | |
| TIME | MESSAGE TYPE ID | MESSAGE SENDING CI |
| 2009-06-08T10:20:00-09:00 | 0012 | web1 |
| 2009-06-08T10:18:52-09:00 | 0017 | ap1 |
| 2009-06-08T10:18:40-09:00 | 0017 | ap2 |
| 2009-06-08T10:16:33-09:00 | 0017 | ap1 |
| 2009-06-08T10:16:33-09:00 | 0005 | db1 |
| 2009-06-08T10:16:31-09:00 | 0005 | db1 |
| : | : | : |

FIG.10A
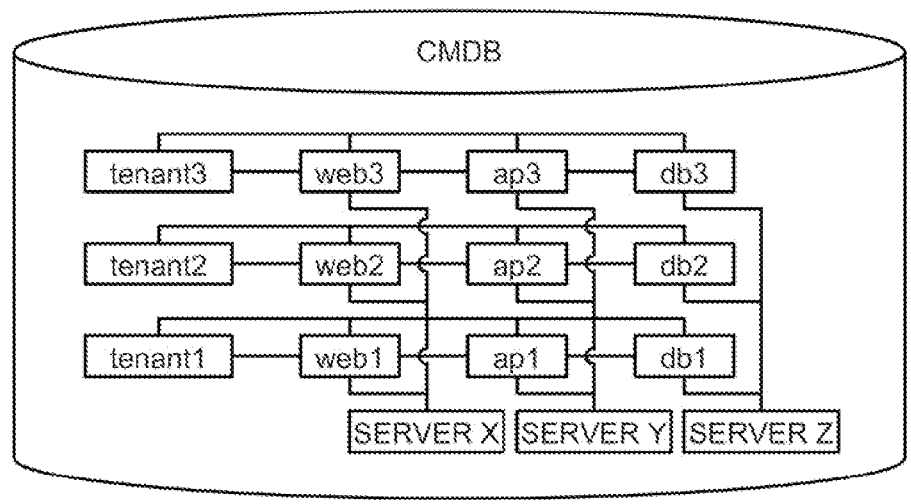
FIG.10B
|      | web1 | ap1 | ap2 | db1 |
|------|------|-----|-----|-----|
| web1 |      | 1   | 3   | 2   |
| ap1  |      |     | 2   | 1   |
| ap2  |      |     |     | 3   |
| db1  |      |     |     |     |
FIG.10C
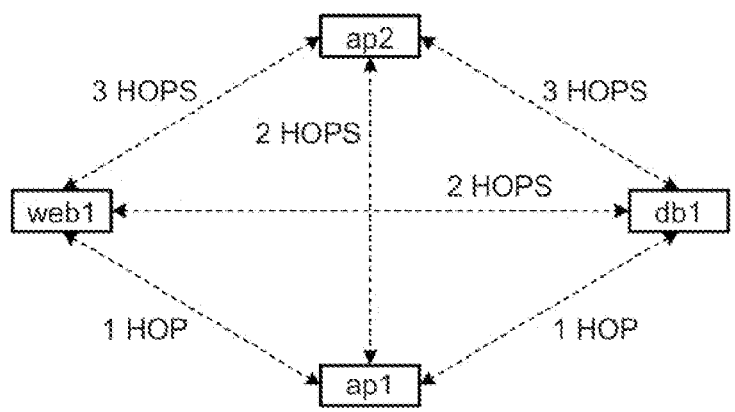

| CI | WEIGHTING FACTOR |
|---|---|
| web1 | 1.0 |
| ap1 | 1.0 |
| ap2 | 0.8 |
| db1 | 1.0 |

TROUBLE PATTERN CREATING PROGRAM AND TROUBLE PATTERN CREATING APPARATUS

CROSS-REFERENCE TO RELATED APPLICATION

This application is based upon and claims the benefit of priority of the prior Japanese Patent Application No. 2010-036512, filed on Feb. 22, 2010, the entire contents of which are incorporated herein by reference.

FIELD

The embodiments discussed herein are directed to a trouble pattern creating program and a trouble pattern creating apparatus.

BACKGROUND

In recent years, with the performance improvement of computers and speeding up of networks, the performance of information technology (IT) systems has improved. IT systems that process highly confidential information such as personal information or information for only in-company use are widely used. Troubles, such as abnormal processes occurring in such IT systems or unauthorized access to the IT systems, often cause serious problems that require prompt action.

Accordingly, various trouble monitoring technologies for promptly and accurately detecting troubles occurring in the IT systems have been proposed. For example, with one trouble monitoring technology, trouble message patterns that characterize troubles are extracted from logs of past troubles and stored. If a message pattern that matches a held trouble message pattern is detected during the operation of an IT system, the occurrence of a trouble is detected.

When this trouble detection technology is employed, however, sometimes the noises are mixed into the extracted trouble message and thereby deteriorate the detection accuracy of troubles. For example, with the trouble detection technology, if messages such as a trouble message, a system login message, and a trouble message sequentially occur, a pattern including a normal message that occurs between trouble messages is detected as a part of the trouble message pattern. Accordingly, with this trouble detection technology, in some cases, trouble message patterns including unnecessary messages may be created, thus reducing the detection accuracy of troubles.

Therefore, a method for preventing deterioration in detection accuracy has been proposed (see, for example, Japanese Laid-open Patent Publication No. 2006-318071). Some propose a technology for learning trouble message patterns through repeated learning using, for example, Bayesian estimation as indicated by Equation (1). Specifically, the probability that "trouble A" occurs when "event a" is output is calculated. By using the Bayesian estimation, a trouble detection apparatus can detect the probability that the message output during system operation indicates a trouble.

$$P_{ij}(H1 \mid Y) = \frac{P_{ij}(H1)P_{ij}(Y \mid H1)}{P_{ij}(H1)P_{ij}(Y \mid H1) + P_{ij}(H2)P_{ij}(Y \mid H2)} \quad (1)$$

For example, as illustrated in FIG. 19, when the "event a" is output, suppose that the probability of it being the "trouble A" is $P_{ij}(H1|Y)$ and the probability of it not being the "trouble A" is $P_{ij}(H1|N)$. If another "event a" is output subsequently, $P_{ij}(H1|Y)$ and $P_{ij}(H1|N)$ are updated using $P_{ij}(H1)$, which is a prior probability. By this procedure, every time the "event a" is output, the probability of it being the "trouble A" and the probability of it not being the "trouble A" can be updated. As a result, messages other than those that definitely occur during the trouble can be excluded from the trouble message patterns, and it is possible to more accurately detect troubles using the trouble message patterns.

However, with the conventional technology described above, there is a problem in that a lot of time is required to create the trouble message patterns which would realize highly accurate trouble detection. Specifically, with the method of calculating the probability of the trouble message patterns using the Bayesian estimation, because the probability is learned using a message obtained when exactly the same trouble occurred in the past, exactly the same troubles need to occur and messages that are output at that time need to be collected. Accordingly, because trouble message patterns of troubles that occur less frequently, for example, once a month, can only be collected once a month, the probability thereof can also only be collected once a month. Therefore, a lot of time is required to improve the accuracy of the probability for all of the possible trouble message patterns.

SUMMARY

According to an aspect of an embodiment of the invention, a trouble pattern creating apparatus, includes a configuration-item extracting unit that extracts, from a plurality of log messages that are output from an information system having a plurality of configuration items and that are output in a predetermined period of time, configuration items that output the log messages, a degree-of-relationship calculating unit that calculates a degree of relationship between the configuration items extracted by the configuration-item extracting unit, a learning execution unit that executes learning of the rate of the number of occurrences of troubles in the information system in the number of times the log messages are output, the learning is executed by a number of times corresponding to the degree of relationship calculated by the degree-of-relationship calculating unit, and a pattern creating unit that creates, in accordance with a result of the learning by the learning execution unit, a trouble pattern message.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 5 is a schematic diagram illustrating an example of information stored in a trouble information DB;

FIG. 6 is a schematic diagram illustrating an example of information stored in a weighting factor decision DB;

FIG. 7 is a schematic diagram illustrating an example of information stored in a number-of-learning-repetitions decision DB;

FIG. 8 is a schematic diagram illustrating an example of information stored in a trouble pattern DB;

FIG. 9 is a schematic diagram illustrating an example of message groups of configuration items to be extracted;

FIGS. 10A to 10C are schematic diagrams illustrating a calculation example of a hop count between configuration items;

DESCRIPTION OF EMBODIMENT(S)

Preferred embodiments of the present invention will be explained with reference to accompanying drawings. The present invention is not limited to the embodiments described below.

[a] First Embodiment

Figure 1:
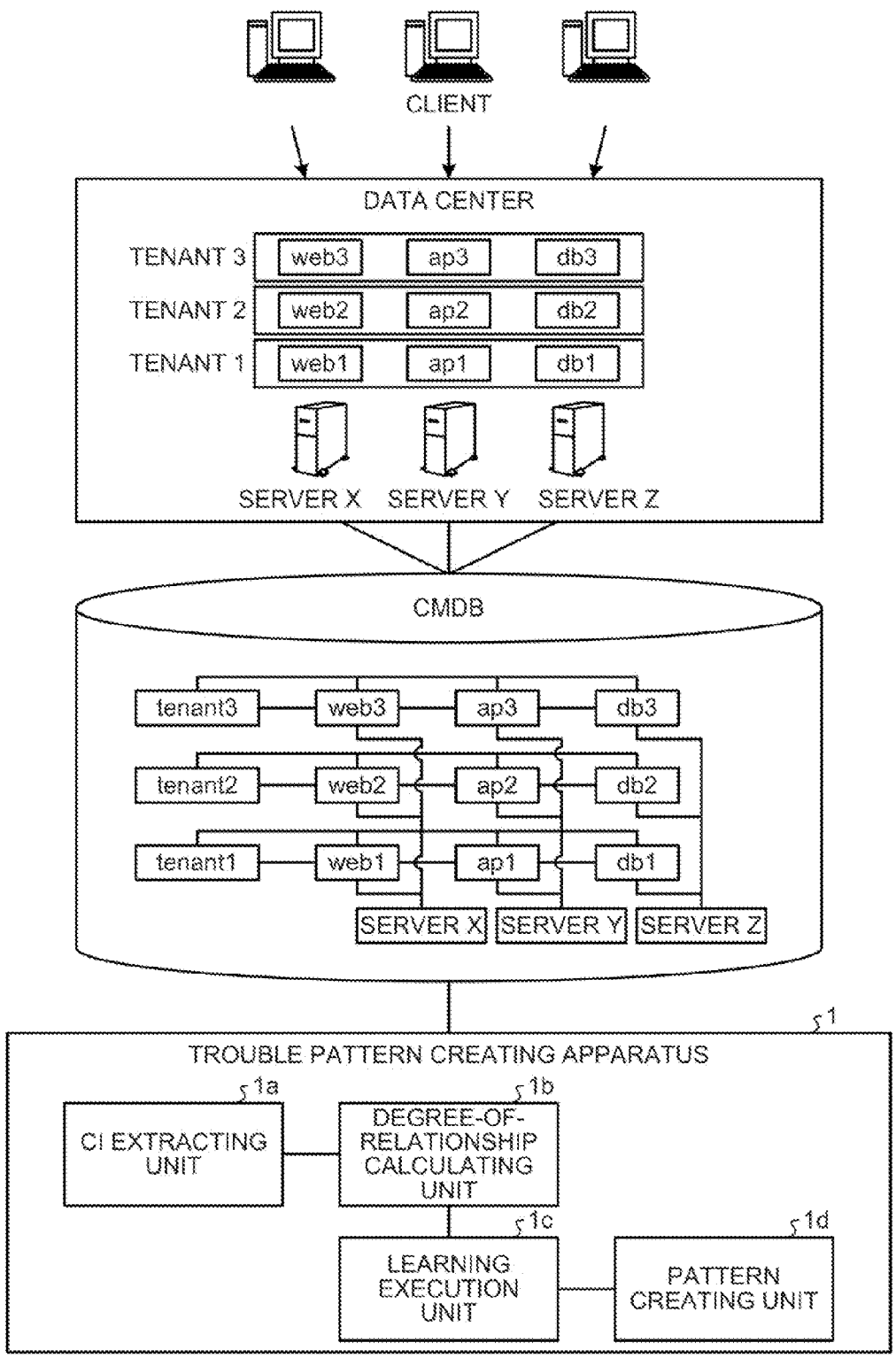
FIG. 1 is a schematic diagram illustrating the overall configuration of a system including a trouble pattern creating apparatus according to an embodiment of the present invention.

FIG. 1 is a schematic diagram illustrating the overall configuration of a system including a trouble pattern creating apparatus disclosed in the present invention. As illustrated in FIG. 1, a trouble pattern creating apparatus 1 is an apparatus that creates trouble message patterns that are used to detect troubles occurring in configuration items managed by a data center that provides cloud computing.

A server X in a data center has webs 1 to 3 as configuration items (hereinafter also referred to as "CI") that provide a web service. A server Y has aps 1 to 3 as configuration items that provide an application. A server Z has dbs 1 to 3 as configuration items that provide a database. An information system that has the web 1, the ap 1, and the db 1 is provided as a tenant 1. Similarly, an information system that has the web 2, the ap 2, and the db 2 is provided as a tenant 2. An information system that has the web 3, the ap 3, and the db 3 is provided as a tenant 3.

The configuration items in each server have relationships with other configuration items in the server they belong and with an external configuration items; the relationships are defined in advance. Furthermore, the configuration items in servers are integrally managed in a configuration management database (CMDB). In other words, the CMDB is a database that manages, in an associated manner, multiple different configuration items that are used in different information systems.

With this configuration, the trouble pattern creating apparatus 1 is an apparatus that creates trouble message patterns using the relationships among the configuration items that are managed in the CMDB. In particular, the trouble pattern creating apparatus 1 has a CI extracting unit 1a, a degree-of-relationship calculating unit 1b, a learning execution unit 1c, and a pattern creating unit 1d.

The CI extracting unit 1a extracts, from multiple log messages that are output from multiple information systems having multiple configuration items and in a predetermined period of time, a configuration item that has sent a log message. For example, the CI extracting unit 1a extracts, from log messages that are output from the server X or the server Y the web 1, the ap 2, and the db 1 as the configuration items that send the log messages.

Subsequently, the degree-of-relationship calculating unit 1b calculates the degree of relationship among the configuration items extracted by the CI extracting unit 1a. For example, with respect to the "web 1, ap 2, and db 1" extracted by the CI extracting unit 1a, the degree-of-relationship calculating unit 1b calculates, using the relationships defined in the CMDB in advance, the degree of relationship between the web 1 and the ap 2, the degree of relationship between the web 1 and the db 1, and the degree of relationship between the ap 2 and the db 1.

The learning execution unit 1c learns the rate of the number of troubles occurring in the information system in the number of output log messages. The number of times the learning execution unit 1c learns is in accordance with the degree of relationship that is calculated by the degree-of-relationship calculating unit 1b. For example, the learning execution unit 1c learns a large number of times if the degree of relationship between configuration items calculated by the degree-of-relationship calculating unit 1b is high, whereas it learns a small number of times if the degree of relationship between configuration items is low.

The pattern creating unit 1d creates, in accordance with the learning result obtained by the learning execution unit 1c, a trouble pattern message that is output when a trouble occurs. For example, the pattern creating unit 1d creates a pattern by associating a combination of message IDs obtained when a trouble X occurs with the rate of the combination of the messages being trouble. For example, the pattern creating unit 1d creates a trouble pattern message indicating "0002, 0014, and 0024:1.0" or "0002 and 0046:0.125" with an "ID: establishment".

In this way, according to the first embodiment, it is possible to learn a weighted message pattern using the relationship between the configuration items. Specifically, a message pattern is learned by increasing the weight of messages that are output from neighboring configuration items and by decreasing the weight of a message of a configuration item located at a position where no configuration item outputting a message exists near that configuration item. As a result, even when the total number of messages is small, it is possible to increase the number of learning repetitions of important messages and to decrease the number of learning repetitions of unimportant messages. Accordingly, it is possible to create, in a short time, a trouble message pattern that realizes highly accurate trouble detection.

[b] Second Embodiment

The trouble pattern creating apparatus described in the first embodiment can also have a control unit other than the control unit illustrated in FIG. 1 and can also detect troubles using the created trouble message patterns. Accordingly, in a second embodiment, a trouble detection apparatus will be described in which trouble message patterns are created using the trouble pattern creating apparatus of the present invention and troubles are detected using the created trouble message patterns.

Configuration of the Trouble Detection Apparatus

Figure 2:
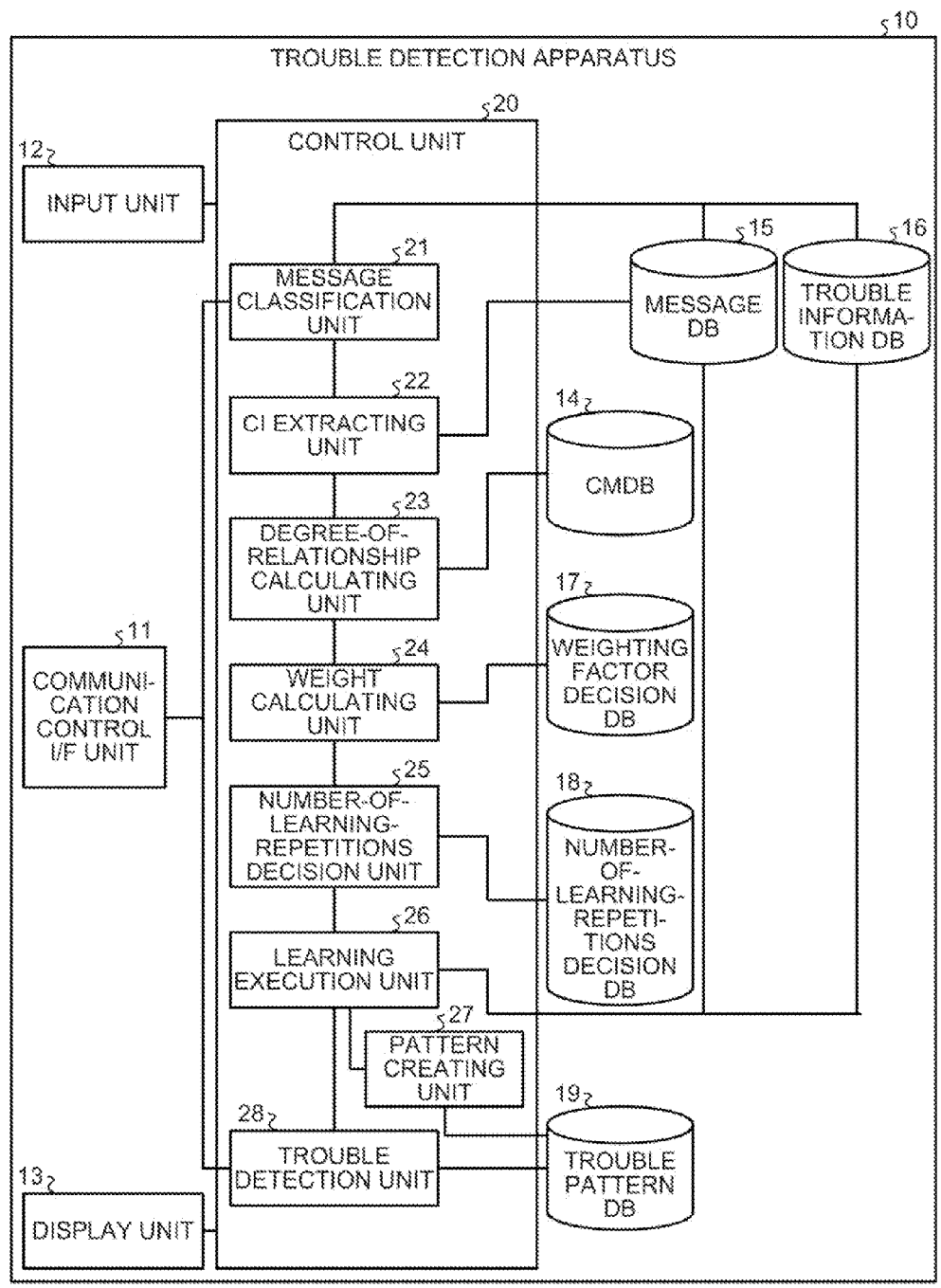
FIG. 2 is a block diagram illustrating the configuration of a trouble detection apparatus according to a second embodiment of the present invention.

First, the configuration of the trouble detection apparatus will be described with reference to FIG. 2. FIG. 2 is a block diagram illustrating the configuration of the trouble detection apparatus according to a second embodiment. As illustrated in FIG. 2, a trouble detection apparatus 10 has a communication control I/F unit 11, an input unit 12, a display unit 13, various databases 14 to 19, and a control unit 20. The various databases, i.e., a CMDB 14, a message DB 15, a trouble information DB 16, a weighting factor decision DB 17, a number-of-learning-repetitions decision DB 18, a trouble pattern DB 19, are semiconductor memory devices or storing units, such as hard disc drives.

The communication control I/F unit 11 is an interface that has at least one communication port and controls information exchanged with other devices. For example, the communication control I/F unit 11 receives messages that are output from each server and sends detected trouble information to a management server.

The input unit 12 is, for example, a keyboard, a mouse, or a microphone. The input unit 12 receives an input of a learning commencement instruction or a learning completion instruction of a trouble message pattern and inputs the instruction to the control unit 20, which will be described later. The display unit 13 also functions as a pointing device by cooperating with the mouse. The display unit 13 is, for example, a monitor, a display, a touch panel, or a speaker. The display unit 13 displays and outputs, for example, trouble message patterns created by the control unit 20, which will be described later, or the detected trouble information.

Figures 3, 4:
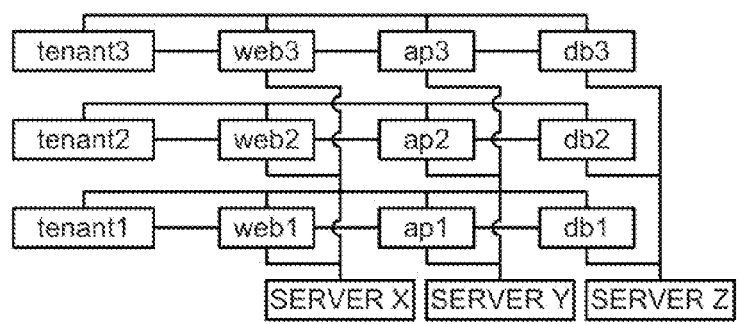
FIG. 3 is a schematic diagram illustrating an example of information stored in a CMDB.
FIG. 4 is a schematic diagram illustrating an example of information stored in a message DB.

When the configuration items included in the servers are virtually integrated and managed, the CMDB 14 manages each configuration item in an associated manner in accordance with the relationship defined in advance. Specifically, each server in the data center that provides cloud computing has the CMDB 14. The CMDB 14 holds in an associated manner, configuration items that constitute information system by cooperating with other configuration items. For example, as illustrated in FIG. 3, the CMDB 14 stores therein, in an associated manner, configuration items "webs 1 to 3" executed by the server X, configuration items "aps 1 to 3" executed by the server Y, configuration items "dbs 1 to 3" executed by the server Z, and "tenants 1 to 3" that indicate cooperative services of the configuration items. FIG. 3 is a schematic diagram illustrating an example of information stored in the CMDB.

The message DB 15 stores therein log messages that are output, in a predetermined period of time, from devices that constitute the information system and that include multiple configuration items or from the configuration item. For example, as illustrated in FIG. 4, the message DB 15 stores therein "2009-06-08-T10:20:00-09:00, 0012 and web1" as the "time, message type ID, and message sending CI", respectively.

The "time" stored in the message DB 15 indicates the time a log message is sent. The "message type ID" is an identifier to uniquely identify the sent log message. The "message sending CI" indicates a configuration item that sends the log message. The information stored in the message DB 15 is automatically stored in a message classification unit 21, which will be described later. FIG. 4 is a schematic diagram illustrating an example of information stored in the message DB.

The trouble information DB 16 stores therein information related to troubles occurring in the devices constituting the information system or related to troubles occurring in the configuration items managed by the CMDB 14. For example, as illustrated in FIG. 5, the trouble information DB 16 stores therein trouble information created in the extensible markup language (XML) format. The trouble information can also be automatically created by the message classification unit 21 or can also be manually created by, for example, an administrator.

For example, the trouble information illustrated in FIG. 5 indicates that, as a "trouble", a "Web Down", which is a trouble of "Trouble=5", occurred between "18:27:00 on 2009/01/05" and "19:05:00 on 2009/01/05". Similarly, the trouble information indicates that a "HDD Fault", which is a trouble denoted by "Trouble=21", occurred between "18:22:00 on 2009/01/07" and "19:20:00 on 2009/01/07". The trouble information indicates that a "DB Slow Down", which is a trouble denoted by "Trouble=39", occurred between "16:13:00 on 2009/01/14" and "16:14:00 on 2009/01/14". The trouble information indicates that a "Web Slow Down", which is a trouble denoted by "Trouble=49", occurred between "4:14:00 on 2009/01/20" and "19:05:00 on 2009/01/20". FIG. 5 is a schematic diagram illustrating an example of information stored in the trouble information DB.

The weighting factor decision DB 17 stores therein information that determine a weighting factor in accordance with the degree of relationship between the configuration items calculated by a degree-of-relationship calculating unit 23, which will be described later. For example, as illustrated in FIG. 6, the weighting factor decision DB 17 stores therein, as "hop count h and weighting factor", "h=1 and 1.0", "h=2 and 0.8", "h=3 and 0.6", "h=4 and 0.2", and "h≥5 and 0.0". The weighting factor stored in the weighting factor decision DB 17 is a value obtained by substituting a hop count in the equation of "weighting factor=1.0−0.2×(hop count−1)"; however, the calculation equation is not limited thereto. Any function expression can be used.

The "hop count h" stored in the weighting factor decision DB 17 indicates the degree of relationship between configuration items and is a value calculated using the Dijkstra method. The "weighting factor" indicates a weighting factor that is used for a configuration item. For example, the weighting factor of the configuration item whose degree of relationship is calculated as "3" is "0.6". FIG. 6 is a schematic diagram illustrating an example of information stored in the weighting factor decision DB.

The number-of-learning-repetitions decision DB 18 stores therein information that determines the number of learning repetitions that is used to calculate the probability of outputting, when a trouble occurs, a combination of log messages that are output when a trouble occurs in the information system. For example, as illustrated in FIG. 7, the number-of-learning-repetitions decision DB 18 stores therein, as the "weighting factor w and the number of repetitions", "1.0≤w and 5", "0.8≤w<1.0 and 4", "0.6≤w<0.8 and 3", "0.4≤w<0.6 and 2", "0.2≤w<0.4 and 1", and "w<0.2 and 0".

The "weighting factor w" stored in the number-of-learning-repetitions decision DB 18 is a weighting factor that is determined using the weighting factor decision DB 17. The item of "the number of repetitions" is the number of learning repetitions that is used to calculate the probability of outputting, when a trouble occurs, a combination of the log messages that are output when a trouble occurs in the information system. For example, if the weighting factor is determined to be "0.7", the number of learning repetitions is "3". FIG. 7 is a schematic diagram illustrating an example of information stored in the number-of-learning-repetitions decision DB.

The trouble pattern DB 19 stores therein a trouble pattern message that is a pattern of messages output at the time of trouble and that indicates, for each combination of log messages, the probability that the combination is output when a trouble occurs. For example, as illustrated in FIG. 8, the trouble pattern DB 19 stores therein, in an XML format, trouble pattern messages and the probability of the pattern corresponding to a trouble.

The information illustrated as an example in FIG. 8 indicates that, when a combination of messages whose "message type IDs" are "0005, 0148, 0150" is output as a "trouble pattern message (Pattern)", the probability of the trouble denoted by "Trouble=5" is "score=0.018". Furthermore, the information indicates that, when a combination of messages whose "message type IDs" are "0002, 0095, 0098, 0110" is output as a "trouble pattern message (Pattern)", the probability of the trouble denoted by "Trouble=5" is "score=0.125". Furthermore, the information indicates that, when a combination of messages whose "message type IDs" are "0006, 0095, 0110, 0148" is output as a "trouble pattern message (Pattern)", the probability of the trouble denoted by "Trouble=5" is "score=1.0".

In other words, when a combination of messages whose "message type IDs" are "0006, 0095, 0110, 0148" is output, a trouble B occurs with a probability of 100%. FIG. 8 is a schematic diagram illustrating an example of information stored in the trouble pattern DB.

The control unit 20 is, for example, an electronic circuit, such as a central processing unit (CPU) or a micro processing unit (MPU). The control unit 20 has an internal memory for storing a control program, such as an operating system (OS), programs prescribing various kinds of procedures, and other data. Furthermore, the control unit 20 has the message classification unit 21, a CI extracting unit 22, the degree-of-relationship calculating unit 23, a weight calculating unit 24, a number-of-learning-repetitions decision unit 25, a learning execution unit 26, a pattern creating unit 27, and a trouble detection unit 28, which implement various processes.

The message classification unit 21 receives, via the communication control I/F unit 11, the log messages that are output from the servers and classifies the messages in the message DB 15 and the trouble information DB 16. For example, the message classification unit 21 stores therein, as a message dictionary, information for specifying a normal log message, specific information, and trouble information or information for performing character recognition. Then, if the message classification unit 21 receives, via the communication control I/F unit 11, a log message, the message classification unit 21 refers to the message dictionary and performs the character recognition. If the message classification unit 21 determines that the log message is a normal log message, the message classification unit 21 stores the message in the message DB 15. If the message classification unit 21 determines that the log message is a trouble message, it stores the message in the trouble information DB 16.

The CI extracting unit 22 extracts, from multiple log messages that are output from an information system including multiple configuration items and in a predetermined period of time, a configuration item that has sent a log message. For example, the CI extracting unit 22 extracts, from messages extracted from the message DB 15, a "message sending CI" for "Window width=10 minutes" as illustrated in FIG. 9. In the example illustrated in FIG. 9, the CI extracting unit 22 extracts the "web 1, ap 1, ap 2, and db 1" as the "message sending CI" and outputs them to the degree-of-relationship calculating unit 23.

In this case, a group of messages from which the configuration item is extracted are messages corresponding to "Window width=10 minutes", in other words, messages which are output within a time period of ten minutes before a certain log message stored in the message DB 15 is output. The next message group will be a group of messages output within a time period of ten minutes before the output of a message, which is output next to the certain log message. The "Window width" described here is only an example; therefore, the window width is not limited to ten minutes. FIG. 9 is a schematic diagram illustrating an example of a message group from which the configuration items are extracted.

The degree-of-relationship calculating unit 23 calculates a hop count between the configuration items as the degree of relationship between the configuration items extracted by the CI extracting unit 22. For example, suppose that the configuration items have the relationship illustrated in FIG. 10A and suppose that the CI extracting unit 22 extracts "web 1, ap 1, ap 2 and db 1" as "message sending CI". In such a case, the degree-of-relationship calculating unit 23 creates a matrix that indicates a combination of the extracted configuration items "web 1, ap 1, ap 2, and db 1" and calculates a hop count, which indicates the relationship between the configuration items of the combination, using the relationship illustrated in FIG. 10A and the Dijkstra method. Subsequently, as illustrated in FIG. 10B, the degree-of-relationship calculating unit 23 creates a matrix that indicates both the combination of the configuration items and the hop count.

For example, as illustrated in FIG. 10A, because the web 1 is directly connected to the ap 1, the degree-of-relationship calculating unit 23 calculates the "hop count between the web 1 and the ap 1" as "1". Furthermore, as illustrated in FIG. 10A, because the connection between the web 1 and the ap 2 is established by a path "from the web 1 to the ap 1 then to the server Y and to the ap 1", the degree-of-relationship calculating unit 23 calculates the "hop count between the web 1 and the ap 2" as "3". In this way, the degree-of-relationship calculating unit 23 calculates a hop count for each combination of the configuration items "web 1, ap 1, ap 2, and db 1".

Specifically, as illustrated in FIG. 10C, the degree-of-relationship calculating unit 23 calculates the hop count between the web 1 and the ap 1 as 1, the hop count between the web 1 and the db 1 as 2, and the hop count between the web 1 and the ap 2 as 3. Furthermore, the degree-of-relationship calculating unit 23 calculates the hop count between the ap 1 and the db 1 as 1, the hop count between the ap 1 and the ap 2 as 2, and the hop count between the db 1 and the ap 2 as 3 and outputs the calculation result to the weight calculating unit 24. FIGS. 10A to 10C are schematic diagrams illustrating a calculation example of the hop count between configuration items.

For the combination of the configuration items whose degree of relationship calculated by the degree-of-relationship calculating unit 23 is equal to or greater than a threshold, the weight calculating unit 24 calculates a weighting factor of each configuration item using the calculated degree of the relationship. For example, for each configuration item extracted by the CI extracting unit 22, the weight calculating unit 24 specifies, from the weighting factor decision DB 17, a weighting factor corresponding to the hop count calculated by the degree-of-relationship calculating unit 23 and outputs the weighting factor to the number-of-learning-repetitions decision unit 25.

In the example described above, the weight calculating unit 24 specifies a weighting factor in a case in which the "ap 1" that is the configuration item extracted by the CI extracting unit 22 is specified as a starting point, a case in which the "ap 2" is specified as a starting point, a case in which the "web 1" is specified as a starting point, and a case in which the "db 1" is specified as a starting point. Then, the weight calculating unit 24 specifies, as a weighting factor, a value having the maximum weighting factor or an average value of the four patterns. At this time, the weight calculating unit 24 excludes a combination of configuration items whose hop count is, for example, "equal to or greater than 5".

In the following, a description will be given using the relationship, as an example, illustrated in FIGS. 10A to 10C. For example, in a case in which the "ap 1" is specified as the starting point, the hop count between the ap 1 and the web 1 is 1, the hop count between the ap 1 and the ap 2 is 2, and the hop count between the ap 1 and the db 1 is 1. In such a case, the weight calculating unit 24 specifies that, using the weighting factor decision DB 17, the weighting factor of the "web 1" is "1.0", the weighting factor of the "ap 2" is "0.8", and the weighting factor of the "db 1" is "1.0".

Similarly, in a case in which the "ap 2" is specified as a starting point, the hop count between the ap 2 and the web 1 is 3, the hop count between the ap 2 and the ap 1 is 2, and the hop count between the ap 2 and the db 1 is 3. In such a case, the weight calculating unit 24 specifies that, using the weighting factor decision DB 17, the weighting factor of the "web 1" is "0.6", the weighting factor of the "ap 1" is "0.8", and the weighting factor of the "db 1" is "0.6".

Similarly, in a case in which the "web 1" is specified as a starting point, the hop count between the web 1 and the ap 1 is 1, the hop count between the web 1 and the ap 2 is 3, and the hop count between the web 1 and the db 1 is 2. In such a case, the weight calculating unit 24 specifies that, using the weighting factor decision DB 17, the weighting factor of the "ap 1" is "1.0", the weighting factor of the "ap 2" is "0.6", and the weighting factor of the "db 1" is "0.8".

Similarly, in a case in which the "db 1" is specified as a starting point, the hop count between the db 1 and the web 1 is 2, the hop count between the db 1 and the ap 1 is 1, and the hop count between the db 1 and the ap 2 is 3. In such a case, the weight calculating unit 24 specifies that, using the weighting factor decision DB 17, the weighting factor of the "web 1" is "0.8", the weighting factor of the "ap 1" is "1.0", and the weighting factor of the "ap 2" is "0.6".

Figures 11, 12:
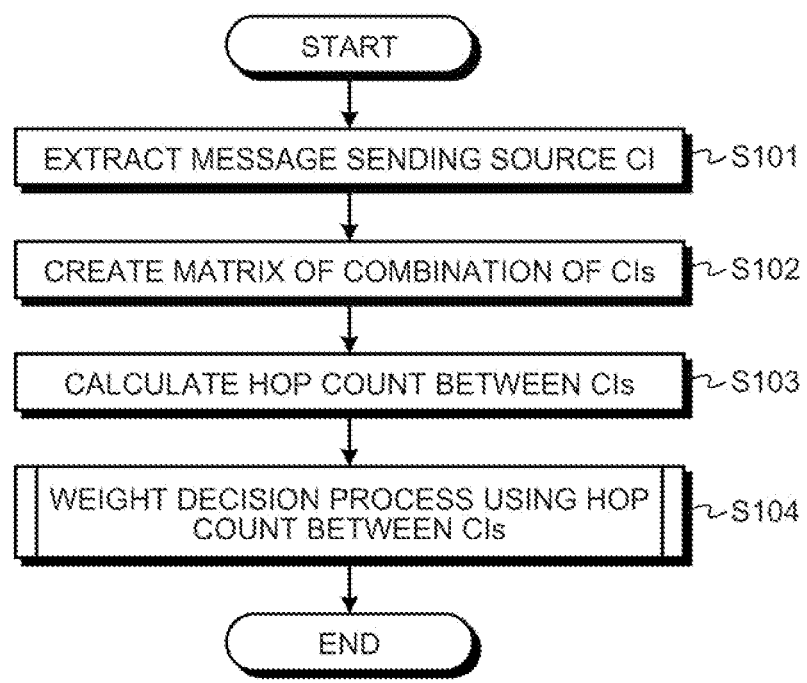
FIG. 11 is a schematic diagram illustrating an example of a weighting factor specified for each configuration item.
FIG. 12 is a flowchart illustrating the flow of a weighting factor decision process performed by the trouble detection apparatus according to the second embodiment.

Accordingly, candidates for the weighting factors of the "web 1" are "1.0, 0.6, and 0.8", candidates for the weighting factors of the "ap 1" are "0.8, 1.0, and 1.0", candidates for the weighting factors of the "ap 2" are "0.8, 0.6, and 0.6", and candidates for the weighting factors of the "db 1" are "1.0, 0.6, and 0.8". If a value having the maximum weighting factor is specified as the weighting factor, the weight calculating unit 24 specifies, from among three values obtained from the above four patterns, the maximum value as the weighting factor. In other words, as illustrated in FIG. 11, the weight calculating unit 24 creates "web 1 and 1.0", "ap 1 and 1.0", "ap 2 and 0.8", and "db 1 and 1.0" as the "CI and weighting factor". FIG. 11 is a schematic diagram illustrating an example of the weighting factor specified for each configuration item.

By using the weighting factors of the configuration items calculated by the weight calculating unit 24, the number-of-learning-repetitions decision unit 25 decides the number of learning repetitions that is used to calculate the probability that multiple log messages output in a predetermined period of time corresponds to the combination of messages that are output when a trouble occurs in an information system. Specifically, by using the weighting factor of the configuration item of the sending source calculated by the weight calculating unit 24, the number-of-learning-repetitions decision unit 25 calculates weighting factors of all of the log messages that are output in a predetermined period of time. Then, the number-of-learning-repetitions decision unit 25 specifies, from the number-of-learning-repetitions decision DB 18, the number of repetitions corresponding to the weighting factors of all of the calculated log messages and outputs, to the learning execution unit 26, the number of repetitions as the number of learning repetitions.

For example, suppose that the number-of-learning-repetitions decision unit 25 determines that, for 15 log messages that are output in a predetermined period of time, the number of times the "web 1" corresponds to the sending source is five, the number of times the "ap 1" corresponds to the sending source is five, the number of times the "ap 2" corresponds to the sending source is three, and the number of times the "db 1" corresponds to the sending source is two. In such a case, by using a weighting factor for each configuration item described above, the number-of-learning-repetitions decision unit 25 calculates the weighting factors of all of the 15 log messages as "(1.0×5+1.0×3+0.8×3+1.0×2)/15=0.826666 . . . ". Then, the number-of-learning-repetitions decision unit 25 specifies, from the number-of-learning-repetitions decision DB 18, the number of repetitions that corresponds to the calculated weighting factor "0.826" is "4".

In other words, if the degree of relationship of the combination of log messages that are output in a predetermined period of time is high in the "relationship" in the CMDB 14, i.e., if they are associated with a small hop count, the number of repetitions determined by the number-of-learning-repetitions decision unit 25 increases. In contrast, if the degree of relationship of the combination of log messages that are output in a predetermined period of time is low in the "relationship" in the CMDB 14, i.e., if they are associated with a large hop count, the number of repetitions determined by the number-of-learning-repetitions decision unit 25 decreases.

Using trouble information which indicates information related to a trouble, the learning execution unit 26 learns the probability that the messages are the combination of messages which are output when a trouble occurs in an information system. The learning execution unit 26 performs this learning process a number of times determined by the number-of-learning-repetitions decision unit 25. For example, the learning execution unit 26 learns the rate of the number of times the trouble occurs in the information system to the number of times the log messages are output; the learning execution unit 26 performs this learning process a number of times determined by the number-of-learning-repetitions decision unit 25. In other words, the learning execution unit 26 estimates the number of actual troubles among the number of observations of a certain message pattern as a probability.

Specifically, the learning execution unit 26 extracts, from the message DB 15, log messages A, B, and C observed at a predetermined date and time and determines, by referring to the trouble information DB 16, whether a trouble occurs at the time of the observation. Then, if the learning execution unit 26 determines that no trouble occurs when the combination of the log messages A, B, and C is observed, the learning execution unit 26 repeatedly calculates, for the same number of times as that determined by the number-of-learning-repetitions decision unit 25, the probability of the log messages A, B, and C not being a trouble. Accordingly, the probability of the combination of the log messages A, B, and C being a trouble becomes small.

In contrast, if the learning execution unit 26 determines that a trouble occurs when the combination of the log messages A, B, and C is observed, the learning execution unit 26 repeatedly calculates, for the same number of times as that determined by the number-of-learning-repetitions decision unit 25, the probability of the messages A, B, and C being a trouble. Accordingly, the probability of the combination of the log messages A, B, and C being a trouble becomes large.

Specifically, if the degree of relationship of a combination of the log messages observed using the message DB 15 at a given time is high and if no trouble occurs at that time, the learning execution unit 26 learns in such a manner that the probability of that combination of the log messages being a trouble becomes small. In contrast, if the degree of relationship of a combination of the log messages observed using the message DB 15 at a given time is high and if the trouble B occurs, the learning execution unit 26 learns in such a manner that the probability of that combination of the log messages being the trouble B becomes large. In other words, for a probability that is calculated when the degree of relationship of a combination of the observed log messages is high, the reliability thereof is determined to be high; therefore, the number of learning repetitions is made to increase.

In contrast, if the degree of relationship of a combination of the log messages observed using the message DB 15 at a given time is weak, the learning execution unit 26 decreases the number of times it learns whether the combination of the log messages is a trouble. In other words, for a probability that is calculated when the degree of relationship of the combination of the observed log messages is low, the reliability thereof is determined to be low; therefore, the number of learning repetitions is made to decrease.

To perform a learning method, the learning execution unit 26 can perform, for example, Bayesian estimation by the number of times equal to the number of learning repetitions that is determined by using the number of times the log messages A, B, and C are extracted and by using the number of troubles that occur when the log messages A, B, and C are extracted; however the method is not limited thereto. Any learning method can be used. For example, the learning execution unit 26 can use a method in which a coefficient is multiplied in accordance with a determined number of times. For example, if the number of learning repetitions is "4", "coefficient=1.3" is multiplied by a probability that has already been calculated. If the number of learning repetitions is "5", "coefficient=1.5" is multiplied by that probability. Furthermore, if the number of learning repetitions is "1", the learning execution unit 26 can learn the probability by multiplying "coefficient=0.5" by a probability that has been calculated.

The pattern creating unit 27 creates a trouble pattern message in which the probability calculated by the learning execution unit 26 is associated with the combination of log messages. Specifically, the pattern creating unit 27 creates a trouble pattern message indicating, for example, that the probability of the combination of the log messages A, B, and C being the trouble B is 20%, or the probability of the combination of the log messages A, B, and D being the trouble C is 35% and then stores the trouble pattern message in the trouble pattern DB 19. For example, as described above using FIG. 8, the pattern creating unit 27 creates a trouble pattern message indicating that the "message type IDs" are "0005, 0148, and 0150" and the probability of a trouble denoted by "Trouble=5" occurring when the combination of the messages is output is "score=0.018". Then, the pattern creating unit 27 stores the trouble pattern message in the trouble pattern DB 19. Here, a case in which "score" indicating the rate of the trouble is stored is described as an example; however, the present invention is not limited thereto. For example, the probability of "score×100" can also be stored.

The trouble detection unit 28 observes messages output from, for example, a server device corresponding to a target device in which a trouble is detected. If the trouble detection unit 28 detects a trouble pattern stored in the trouble pattern DB 19, the trouble detection unit 28 notifies the occurrence of the trouble. For example, the trouble detection unit 28 obtains messages that are output during the period of time from when messages, which are output from the server device corresponding to the target device in which the trouble is detected, are observed until 10 minutes later. Subsequently, the trouble detection unit 28 determines whether the combination of the obtained messages is stored in the trouble pattern DB 19. Then, if the combination of the obtained messages is not stored in the trouble pattern DB 19, the trouble detection unit 28 sends, to a management device, a message indicating that no trouble occurs or displays the message on the display unit 13.

In contrast, if the combination of the obtained messages is stored in the trouble pattern DB 19, the trouble detection unit 28 determines whether the score of the combination of the messages or the probability is equal to or greater than a predetermined value. If the score or the probability is equal to or greater than the predetermined value, the trouble detection unit 28 detects the occurrence of the trouble and then sends a message to the management device or displays the message on the display unit 13. In contrast, if the score or the probability is less than the predetermined value, the trouble detection unit 28 detects a possible trouble and then sends a message to the management device or displays the message on the display unit 13.

Flow of Processes

In the following, the flow of the process performed by the trouble detection apparatus according to the second embodiment will be described with reference to FIGS. 12 to 17. Here, a weighting factor decision process will be described first. Then, a weight decision process that is part of the weighting factor decision process and that uses a hop count between the configuration items, and a weight decision process that is performed on configuration items at both ends of a path as part of the weight decision process and that uses a hop count will be described in the order they appear in this sentence. Furthermore, a weighted learning process, a learning implementation process using Bayesian estimation, and a trouble detection process will also be described in the order they appear in this sentence.

Weighting Factor Decision Process

First, the weighting factor decision process will be described with reference to FIG. 12. FIG. 12 is a flowchart illustrating the flow of the weighting factor decision process performed by the trouble detection apparatus according to the second embodiment.

As illustrated in FIG. 12, the CI extracting unit 22 in the trouble detection apparatus 10 extracts, from multiple log messages that are output from the information system in a predetermined period of time, configuration items that output the log messages (Step S101).

For example, if a message arrives in a predetermined period of time in which trouble message patterns are created or if a commencement instruction is received by the input unit 12, the CI extracting unit 22 extracts configuration items from the message groups stored in the message DB 15. Specifically, the CI extracting unit 22 obtains, from the message DB 15, multiple messages in a predetermined "window width".

Subsequently, the degree-of-relationship calculating unit 23 creates a matrix that indicates the combination of the configuration items extracted by the CI extracting unit 22 (Step S102). Then, using the "relationship" between the configuration items stored in the CMDB 14, for the configuration items that constitute the matrix, the degree-of-relationship calculating unit 23 calculates a hop count between the configuration items (Step S103).

Thereafter, for the combination of the configuration items whose degree of relationship calculated by the degree-of-relationship calculating unit 23 is equal to or greater than the threshold, the weight calculating unit 24 performs the weight decision process using the calculated degree of relationship and using a hop count between the configuration items that calculate each weighting factor of the configuration item (Step S104).

The weight calculating unit 24 repeatedly performs processes in Steps S101 to S104 until a predetermined "window width" includes the last message stored in the message DB 15. In other words, the weight calculating unit 24 performs the process on all of the messages stored in the message DB 15. Accordingly, the weight calculating unit 24 extracts, for each obtained message, configuration items and calculates the hop counts.

Weight Decision Process Using the Hop Count Between the Configuration Items

Figure 13:
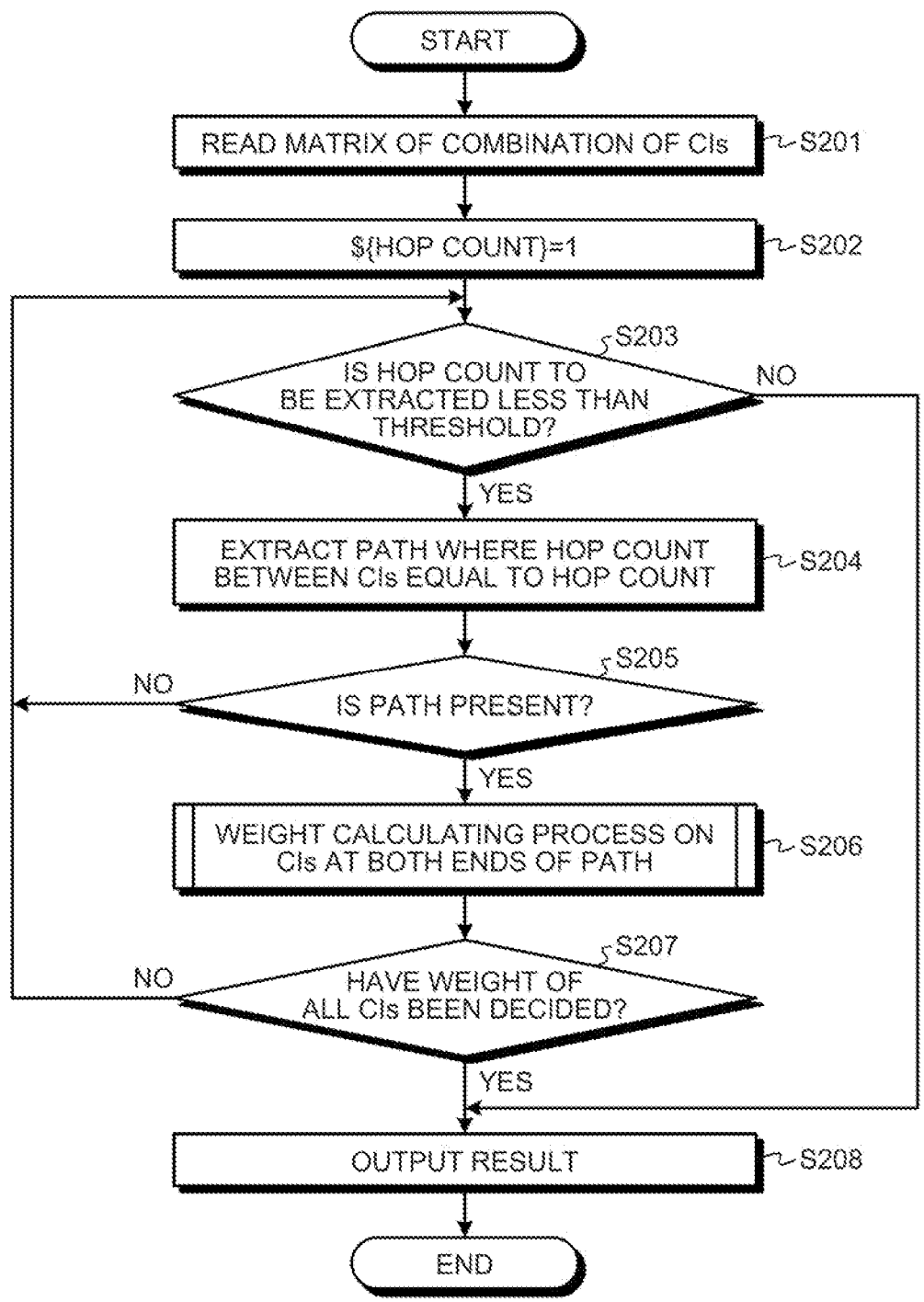
FIG. 13 is a flowchart illustrating the flow of a weight decision process that is part of the weighting factor decision process and that uses a hop count between the configuration items.

In the following, the weight decision process using the hop count between the configuration items will be described with reference to FIG. 13. FIG. 13 is a flowchart illustrating the flow of the weight decision process that is part of the weighting factor decision process and that uses a hop count between the configuration items. This process is performed at Step S104 in FIG. 12.

As illustrated in FIG. 13, the weight calculating unit 24 in the trouble detection apparatus 10 reads the matrix of the configuration items created by the degree-of-relationship calculating unit 23 (Step S201). Subsequently, the weight calculating unit 24 substitutes "1" for the hop count between the configuration items to be extracted (Step S202) and determines whether the hop count to be extracted is less than the threshold (Step S203).

Then, if the hop count to be extracted is less than the threshold (Yes at Step S203), the weight calculating unit 24 extracts a combination of the configuration items that matches the hop count (Step S204) and determines whether a path is present (Step S205).

Subsequently, if a path is present (Yes at Step S205), the weight calculating unit 24 executes the weight calculating process on configuration items at both ends of the path (Step S206). Then, if the weight calculating unit 24 performs a weight calculating process on all of the configuration items constituting the matrix created by the degree-of-relationship calculating unit 23, (Yes at Step S207), the weight calculating unit 24 outputs the calculated weighting factor for each configuration items to the number-of-learning-repetitions decision unit 25 (Step S208).

In contrast, if there is a configuration item that has not been subjected to the weight calculating process in the matrix created by the degree-of-relationship calculating unit 23 (No at Step S207), the weight calculating unit 24 increments the hop count to be extracted by one and repeats the process at Step S203 and the subsequent processes. Furthermore, if the weight calculating unit 24 determines that no path is present at Step S205 (No at Step S205), the weight calculating unit 24 also increments the hop count to be extracted by one and repeats the process at Step S203 and the subsequent processes.

Furthermore, if the hop count is equal to or greater than the threshold at Step S203 (No at Step S203), the weight calculating unit 24 outputs, to the number-of-learning-repetitions decision unit 25, the weighting factor, for each configuration item, that has been calculated by that time (Step S208).

Figure 14:
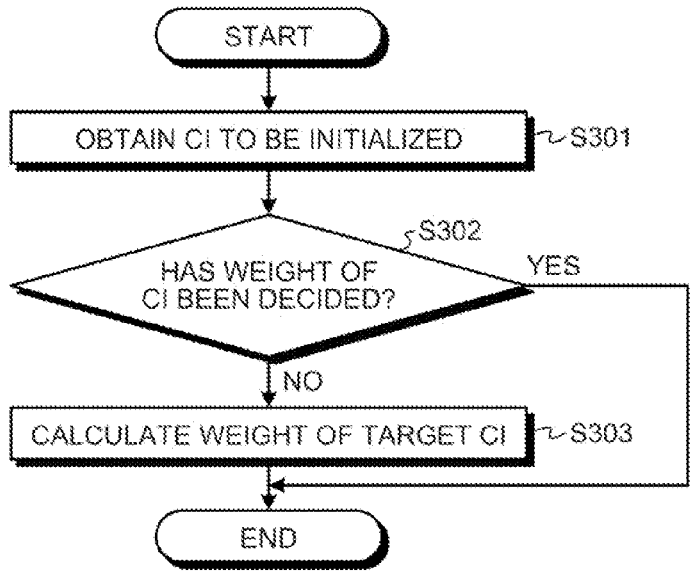
FIG. 14 is a flowchart illustrating the flow of a weight calculating process that is performed on configuration items at both ends of a path as part of the weight decision process and that uses a hop count between the configuration items.

Weight Calculating Process Performed on the Configuration Items at Both Ends of the Path In the following, the weight calculating process performed on the configuration items at both ends of the path will be described with reference to FIG. 14. FIG. 14 is a flowchart illustrating the flow of the weight calculating process that is performed on configuration items at both ends of a path as part of the weight decision process using a hop count between the configuration items. This process is performed at Step S206 in FIG. 13.

As illustrated in FIG. 14, the weight calculating unit 24 in the trouble detection apparatus 10 obtains a configuration item at one end of the path that is detected in the process illustrated in FIG. 13 (Step S301) and determines whether the weight of the obtained configuration item has been decided (Step S302). Then, if the weight of the obtained configuration item has not been decided (No at Step S302), the weight calculating unit 24 specifies, from the weighting factor decision DB 17, the weighting factor corresponding to the hop count of that path (Step S303). The weight calculating unit 24 performs the processes from Steps S301 to S303 on the configuration items at both ends of the path detected in FIG. 13.

Weighted Learning Process

Figure 15:
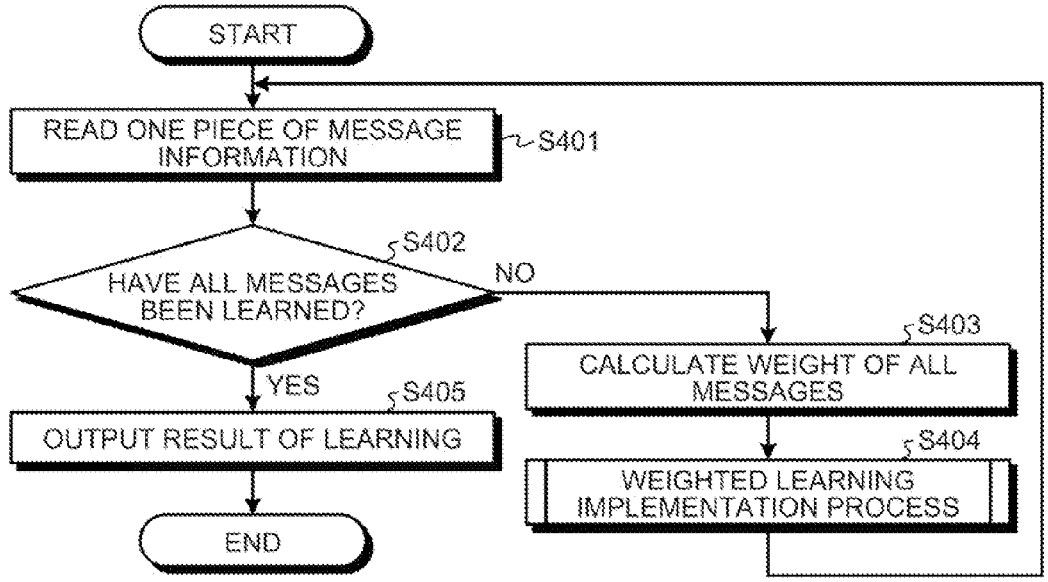
FIG. 15 is a flowchart illustrating the flow of a weighted learning process performed by the trouble detection apparatus according to the second embodiment.

In the following, the weighted learning process will be described with reference to FIG. 15. FIG. 15 is a flowchart illustrating the flow of the weighted learning process performed by the trouble detection apparatus according to the second embodiment.

As illustrated in FIG. 15, the number-of-learning-repetitions decision unit 25 in the trouble detection apparatus 10 reads a piece of message information containing multiple log messages that are extracted from the message DB 15 by the CI extracting unit 22 (Step S401).

Subsequently, the number-of-learning-repetitions decision unit 25 determines whether the read message has already been learned (Step S402). If the read message has not been learned (No at Step S402), by referring to the weighting factor for each calculated configuration item, the number-of-learning-repetitions decision unit 25 calculates the weighting factors of all of the read messages (Step S403).

Then, the learning execution unit 26 performs a weighted learning implementation process, which will be described later (Step S404). If the learning execution unit 26 completes the learning process, the number-of-learning-repetitions decision unit 25 returns to Step S401, reads a piece of the subsequent message information, and then repeats the process at Step S402 and the subsequent processes.

Then, if the learning execution unit 26 performs the weighted learning process on all of the messages stored in the message DB 15 (Yes at Step S402), the learning execution unit 26 outputs the result of the learning to the pattern creating unit 27 (Step S405). In other words, if the predetermined "window width" for obtaining messages reaches the end of the message DB 15, the learning execution unit 26 outputs the result of the learning to the pattern creating unit 27.

Thereafter, the pattern creating unit 27 creates a trouble pattern message in which the probability calculated by the learning execution unit 26 is associated with the combination of the log messages and then stores the trouble pattern message in the trouble pattern DB 19.

Learning Implementation Process Using Bayesian Estimation

Figure 16:
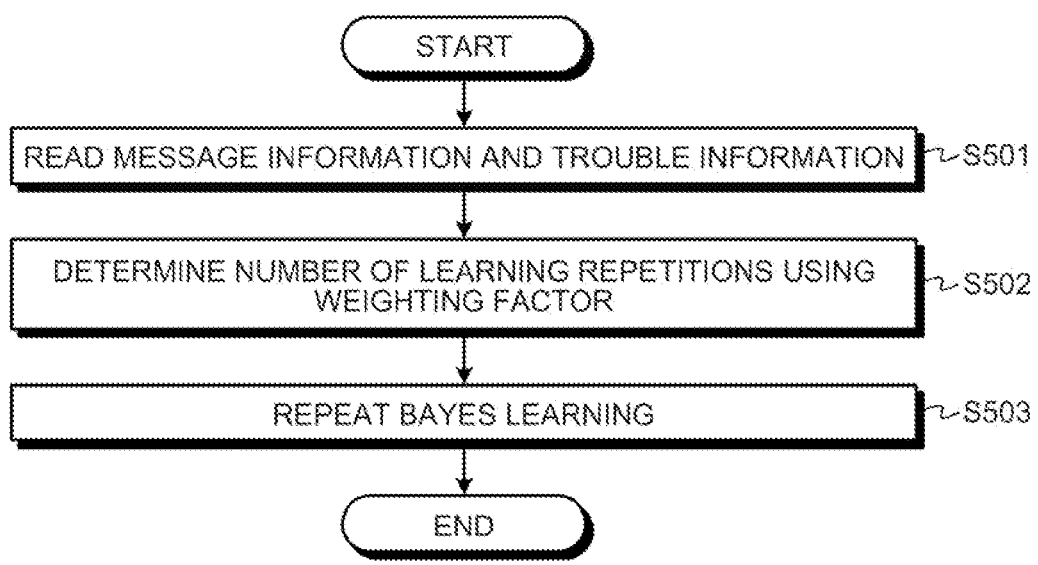
FIG. 16 is a flowchart illustrating the flow of a learning implementation process performed using Bayesian estimation in the weighted learning process.

In the following, the learning implementation process performed using the Bayesian estimation will be described with reference to FIG. 16. FIG. 16 is a flowchart illustrating the flow of the learning implementation process performed using Bayesian estimation in the weighted learning process. This process is performed at Step S404 in FIG. 15.

As illustrated in FIG. 16, the learning execution unit 26 in the trouble detection apparatus 10 reads message information that is used to calculate the probability and reads trouble information (Step S501). The number-of-learning-repetitions decision unit 25 reads the weighting factor for each configuration item calculated by the weight calculating unit 24, calculates the weighting factors of all of the messages, and specifies the calculated number of repetitions from the number-of-learning-repetitions decision DB 18 (Step S502).

Then, the learning execution unit 26 learns the probability of a combination of the log messages being a combination of the messages that are output when a trouble occurs in an information system. The number of times the learning execution unit 26 performs this learning process is the same as that specified by the number-of-learning-repetitions decision unit 25 (Step S503).

Trouble Detection Process

Figure 17:
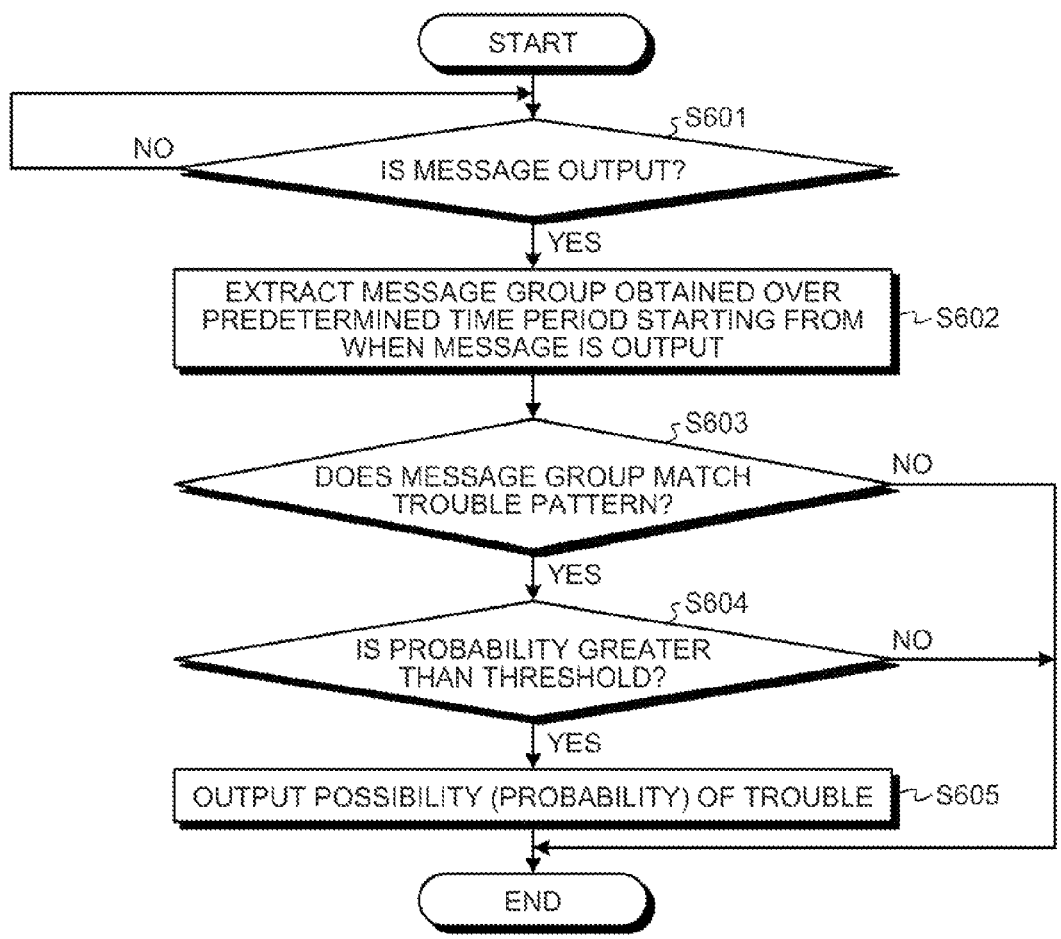
FIG. 17 is a flowchart illustrating the flow of a trouble detection process performed by the trouble detection apparatus according to the second embodiment.

In the following, the trouble detection process using the trouble message pattern that is created by the processes illustrated in FIGS. 12 to 16 will be described with reference to FIG. 17. FIG. 17 is a flowchart illustrating the flow of the trouble detection process performed by the trouble detection apparatus according to the second embodiment. This process is performed every time a message occurs and it is not necessary that it is synchronized with the processes illustrated in FIGS. 12 to 16.

As illustrated in FIG. 17, if a message is output from, for example, a server device corresponding to a target device in which a trouble is detected (Yes at Step S601), the trouble detection unit 28 in the trouble detection apparatus 10 extracts a message group obtained during a predetermined time period starting from when a message is output (Step S602).

Subsequently, the trouble detection unit 28 determines whether the combination of the "message type IDs" in the extracted message group matches the trouble message pattern stored in the trouble pattern DB 19 (Step S603).

If the pattern of the extracted message group matches the trouble message pattern (Yes at Step S603), the trouble detection unit 28 determines whether the probability (score) of the trouble message pattern is greater than the threshold (Step S604).

If the probability (score) of the trouble message pattern is greater than the threshold (Yes at Step S604), the trouble detection unit 28 determines that a probability of a trouble is high and displays, on the display unit 13, that the trouble occurs and the probability thereof (Step S605).

In contrast, if the pattern of the extracted message group does not match the trouble message pattern (No at Step S603) or if the probability (score) of the trouble message pattern is smaller than the threshold (No at Step S604), the trouble detection unit 28 completes the process.

Advantage of the Second Embodiment

As described above, according to the second embodiment, when the trouble detection apparatus that includes the trouble pattern creating apparatus according to an aspect of the present invention is used, it is possible to create, in a short time, a trouble message pattern for highly accurate trouble detection and also to detect a trouble. Furthermore, it is possible to reduce the effect of noise that is output from an irrelevant configuration item and to create the trouble message pattern with a small number of learning repetitions.

[c] Third Embodiment

In the above explanation, the embodiments of the present invention have been described; however, the present invention is not limited to the embodiments described above and can be implemented with various kinds of embodiments other than the embodiment described above. Accordingly, in the following, another embodiment will be described.

Learning Method

In the embodiments described above, a case of using the Bayesian estimation has been described as an exemplary method of learning the probability of a trouble; however, the present invention is not limited thereto. For example, it is also possible to use another method that can repeatedly perform the learning. Furthermore, instead of using the probability of the trouble, it is possible to calculate the probability that the trouble does not occur.

System

Furthermore, of the processes described in the embodiments, the whole or a part of the processes that are mentioned as being automatically performed can be manually performed or the whole or a part of the processes that are mentioned as being manually performed can be automatically performed using known methods. Furthermore, the process procedures, the control procedures, the specific names, and the information containing various kinds of data or parameters indicated in the above specification and drawings, for example, FIGS. 3 to 11, can be arbitrarily changed unless otherwise noted.

The components of each devices illustrated in the drawings are only for conceptually illustrating the functions thereof and are not necessarily physically configured as illustrated in the drawings. For example, the specific shape of a separate or integrated device is not limited to the drawings. For example, the learning execution unit 26 and the pattern creating unit 27 can be integrated. For example, all or part of the device can be configured by functionally or physically separating or integrating any of the units depending on various loads or use conditions. Furthermore, all or any part of the processing functions performed by each device can be implemented by a CPU and by programs analyzed and executed by the CPU or implemented as hardware by wired logic.

Program

The various processes described in the above embodiments can be implemented by programs prepared in advance and executed by a computer such as a personal computer or a workstation. Accordingly, in the following, a computer system that executes programs having the same function as that described in the embodiments described above will be described as an example.

Figure 18:
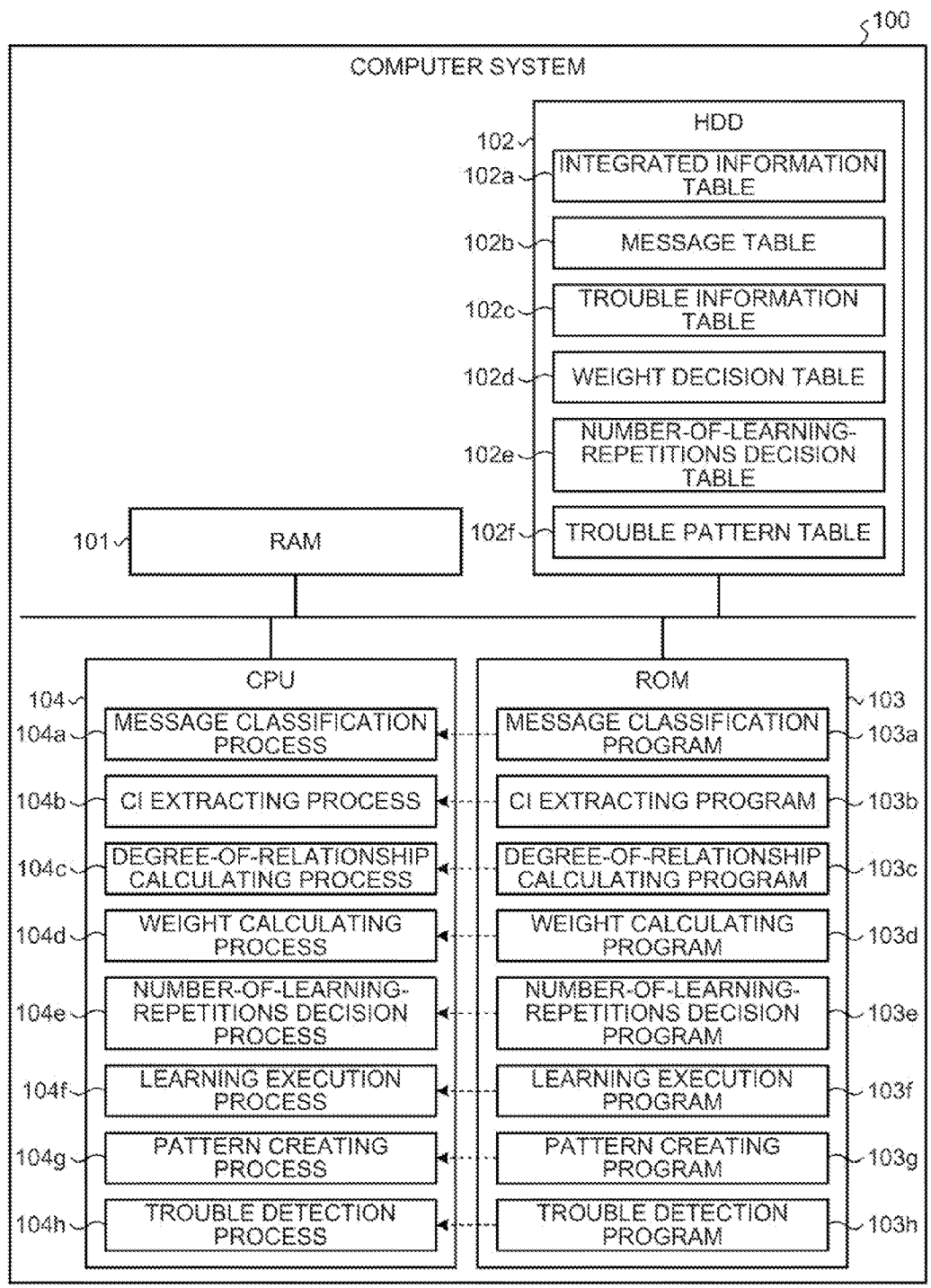
FIG. 18 is a block diagram illustrating a computer system that executes a trouble pattern creating program and a trouble detection program.
Figure 19:
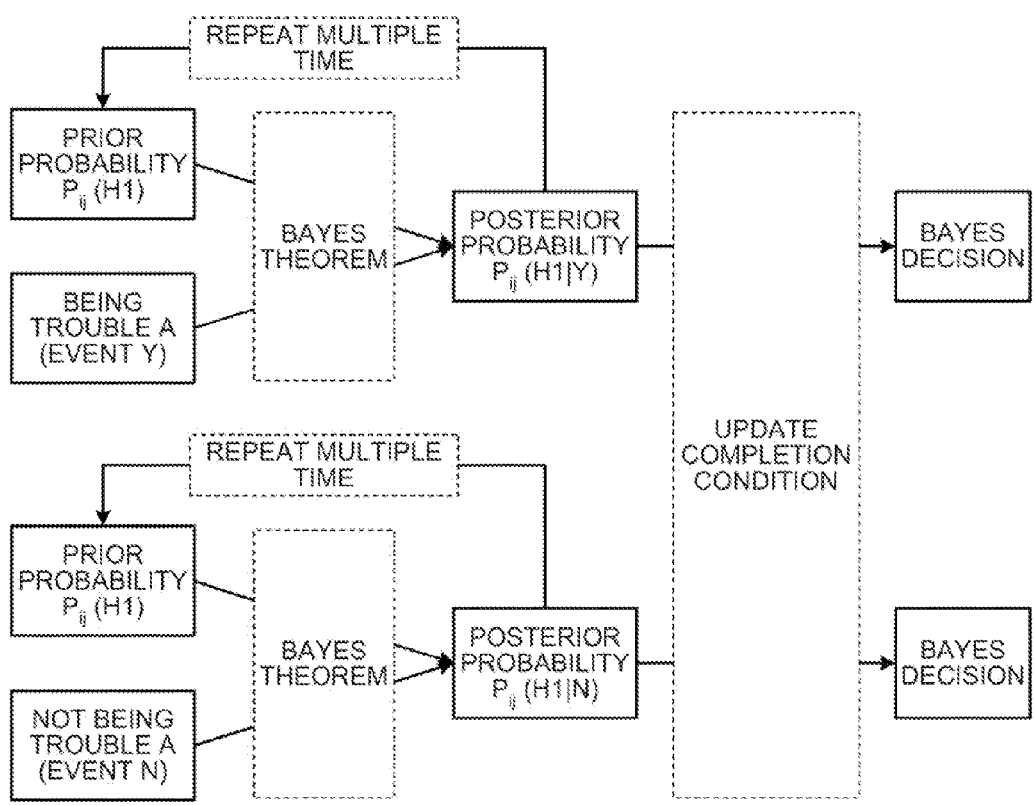
FIG. 19 is a schematic diagram illustrating a learning example using Bayesian estimation.

FIG. 18 is a block diagram illustrating a computer system that executes a trouble pattern creating program and a trouble detection program. As illustrated in FIG. 18, a computer system 100 has a RAM 101, an HDD 102, a ROM 103, and a CPU 104. The ROM 103 stores therein, in advance, programs exhibiting the same function as the above-described embodiments. Specifically, as illustrated in FIG. 18, the ROM 103 stores therein, in advance, a message classification program 103*a*, a CI extracting program 103*b*, a degree-of-relationship calculating program 103*c*, a weight calculating program 103*d*, and a number-of-learning-repetitions decision program 103*e*. Furthermore, the ROM 103 stores therein, in advance, a learning execution program 103*f*, a pattern creating program 103*g*, and a trouble detection program 103*h*.

As illustrated in FIG. 18, the CPU 104 reads these programs 103a to 103h and executes them so that these programs 103a to 103h can function as processes illustrated in FIG. 18, i.e., a message classification process 104a, a CI extracting process 104b, a degree-of-relationship calculating process 104c, a weight calculating process 104d, a number-of-learning-repetitions decision process 104e, a learning execution process 104f, a pattern creating process 104g, and a trouble detection process 104h. The message classification process 104a corresponds to the message classification unit 21 illustrated in FIG. 2. Similarly, the CI extracting process 104b corresponds to the CI extracting unit 22 and the degree-of-relationship calculating process 104c corresponds to the degree-of-relationship calculating unit 23. Furthermore, the weight calculating process 104d corresponds to the weight calculating unit 24, the number-of-learning-repetitions decision process 104e corresponds to the number-of-learning-repetitions decision unit 25, and the learning execution process 104f corresponds to the learning execution unit 26. Furthermore, the pattern creating process 104g corresponds to the pattern creating unit 27 and the trouble detection process 104h corresponds to the trouble detection unit 28.

The HDD 102 includes an integrated information table 102a, a message table 102b, a trouble information table 102c, a weight decision table 102d, a number-of-learning-repetitions decision table 102e, and a trouble pattern table 102f. The integrated information table 102a corresponds to the CMDB 14 illustrated in FIG. 2, the message table 102b corresponds to the message DB 15, the trouble information table 102c corresponds to the trouble information DB 16, and the weight decision table 102d corresponds to the weighting factor decision DB 17. Furthermore, the number-of-learning-repetitions decision table 102e corresponds to the number-of-learning-repetitions decision DB 18 and the trouble pattern table 102f corresponds to the trouble pattern DB 19.

The above described programs 103a to 103h are not necessarily stored in the ROM 103. For example, they can be stored in a "portable physical medium", such as a flexible disk (FD), a CD-ROM, a DVD disk, a magneto-optic disk, an IC card, and the like, that can be inserted into the computer system 100. Furthermore, they can also be stored in a "fixed physical medium", such as a hard disk drive (HDD), that can be arranged inside/outside the computer system 100. Furthermore, they can also be stored in "another computer system" connected to the computer system 100 via a public circuit, the Internet, a LAN, a WAN, and the like. The computer system 100 then reads and executes the programs from the above.

In other words, the programs mentioned in the embodiment can be stored in a computer-readable recording medium, such as the "portable physical medium", the "fixed physical medium", and the "communication medium" described above. Then, the computer system 100 reads the programs from the recording medium and executes them so as to implement the same function as that described in the embodiment. The programs mentioned in this embodiment are not limited to a process performed by the computer system 100. For example, the present invention can be used in a case in which another computer system or server executes the programs or executes the programs in a cooperative manner.

According to an aspect of the trouble pattern creating program and the trouble pattern creating apparatus according to the present invention, an advantage is provided in that it is possible to create, in a short time, a trouble message pattern that is used to highly accurately detect a trouble.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A computer readable, non-transitory medium having stored therein a trouble pattern creating program, the program causing a computer to execute:
   (a) extracting, from a plurality of log messages that are output from an information system having a plurality of configuration items and that are output in a predetermined period of time, configuration items that output the log messages;
   (b) calculating a hop count between the configuration items as a degree of relationship between the configuration items extracted in the (a) extracting;
   (c) executing learning of the rate of the number of occurrences of troubles in the information system in the number of times the log messages are output, the learning is executed by a number of times which increases as the hop count calculated in the (b) calculating increases and the degree of relationship becomes higher;
   (d) creating, in accordance with a result of the learning in the (c) executing, a trouble pattern message that is output when a trouble occurs; and
   (e) calculating, with respect to a combination of configuration items whose degree of relationship calculated in the (b) calculating is equal to or greater than a threshold and using the degree of relationship calculated in the (b) calculating, a weight of each configuration item, wherein the weight of each configuration item uses the hop count between the configuration items.

2. The computer readable, non-transitory medium according to claim 1, further comprising:
   (f) deciding, using the weight of each configuration item calculated in the (e) calculating, a number of learning repetitions that is used to calculate a probability of the log messages being a combination of messages that are output when the trouble occurs, wherein
   the (c) executing includes executing learning by the number of learning repetitions decided in the (f) deciding and includes calculating the probability, and
   the (d) creating includes creating the trouble pattern message in which the probability calculated in the (c) executing is associated with a combination of the log messages.

3. The computer readable, non-transitory medium according to claim 2, wherein
   the (f) deciding includes
   (f1) counting how many times each of the configuration items is a source of the log message,
   (f2) calculating a weight of the log messages as a whole by multiplying, for each configuration item which is the source, the weight obtained in the (e) calculating by the number counted in the (f1) counting, calculating the sum of the weights obtained by multiplication for configuration items which are the source, and dividing the sum by the total number of the log messages; and
   (f3) deciding the number of learning repetitions using the calculated weight of all of the log messages.

4. The computer readable, non-transitory medium according to claim 2, further comprising:
  (g) determining, when log messages are newly output from the information system and after obtaining, from among the messages that are newly output, a message that is output during a predetermined period of time, whether the obtained message matches the trouble pattern message created in the (d) creating;
  (h) determining, if the obtained message matches the trouble pattern message in the (g) determining, whether the probability associated with the message is equal to or greater than a threshold; and
  (i) detecting, if the probability associated with the obtained message in the (h) determining is equal to or greater than the threshold, occurrence of a trouble.

5. A trouble pattern creating apparatus, comprising:
a memory; and
a processor coupled to the memory, the processor executing a process comprising
  (a) extracting, from a plurality of log messages that are output from an information system having a plurality of configuration items and that are output in a predetermined period of time, configuration items that output the log messages;
  (b) calculating a hop count between the configuration items as a degree of relationship between the configuration items extracted in the (a) extracting;
  (c) executing learning of the rate of the number of occurrences of troubles in the information system in the number of times the log messages are output, the learning is executed by a number of times which increases as the hop count calculated in the (b) calculating increases and the degree of relationship becomes higher; and
  (d) creating, in accordance with a result of the learning in the (c) executing, a trouble pattern message that is output when a trouble occurs; and
  (e) calculating, with respect to a combination of configuration items whose degree of relationship calculated in the (b) calculating is equal to or greater than a threshold and using the degree of relationship calculated in the (b) calculating, a weight of each configuration item, wherein the weight of each configuration item uses the hop count between the configuration items.

* * * * *